(12) United States Patent
Pack et al.

(10) Patent No.: US 8,805,037 B2
(45) Date of Patent: Aug. 12, 2014

(54) METHOD AND SYSTEM FOR RECONSTRUCTION OF TOMOGRAPHIC IMAGES

(75) Inventors: Jed Douglas Pack, Glenville, NY (US); Bruno Kristiaan Bernard DeMan, Clifton Park, NY (US); Paulo Ricardo dos Santos Mendonca, Clifton Park, NY (US); Kai Zeng, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 426 days.

(21) Appl. No.: 13/149,702

(22) Filed: May 31, 2011

(65) Prior Publication Data

US 2012/0308100 A1 Dec. 6, 2012

(51) Int. Cl.
*G06K 9/00* (2006.01)

(52) U.S. Cl.
USPC .......................................................... 382/128

(58) Field of Classification Search
USPC ................................. 382/128–134
See application file for complete search history.

(56) References Cited

U.S. PATENT DOCUMENTS

| | | | |
|---|---|---|---|
| 5,400,255 A * | 3/1995 | Hu | 378/4 |
| 6,173,030 B1 | 1/2001 | Patch | |
| 6,266,388 B1 | 7/2001 | Hsieh | |
| 6,292,526 B1 | 9/2001 | Patch | |
| 6,522,712 B1 | 2/2003 | Yavuz | |
| 6,574,299 B1 | 6/2003 | Katsevich | |
| 6,771,733 B2 | 8/2004 | Katsevich | |
| 6,804,321 B2 | 10/2004 | Katsevich | |
| 6,813,373 B1 * | 11/2004 | Suri et al. | 382/128 |
| 6,839,400 B2 | 1/2005 | Bruder | |
| 6,898,264 B2 | 5/2005 | Katsevich | |
| 6,907,100 B2 | 6/2005 | Taguchi | |
| 6,917,663 B2 | 7/2005 | Taguchi | |
| 6,990,167 B2 | 1/2006 | Chen et al. | |
| 7,058,156 B2 | 6/2006 | Bruder | |
| 7,180,975 B2 | 2/2007 | Heuscher et al. | |
| 7,203,272 B2 | 4/2007 | Chen et al. | |
| 7,251,307 B2 | 7/2007 | Chen et al. | |

(Continued)

FOREIGN PATENT DOCUMENTS

| | | |
|---|---|---|
| JP | 2009034478 A | 2/2009 |
| WO | 2004015431 A2 | 6/2004 |
| WO | 2005004063 A2 | 1/2005 |
| WO | 2007004196 A2 | 1/2007 |

OTHER PUBLICATIONS

Kachelrieβ, M., et al., "Extended Parallel Backprojection for Standard Three-Dimentional and Phase-Correlated Four-dimensional Axial and Spiral Cone-Beam CT with Arbitrary Pitch, Arbitrary Cone-Angle and 100% Dose Usage", Medical Physics, 2004, pp. 1623-1641, vol. 31, ©American Association of Physicists in Medicine.

(Continued)

*Primary Examiner* — Alex Liew
(74) *Attorney, Agent, or Firm* — Fletcher Yoder, P.C.

(57) ABSTRACT

Approaches are described for generating an initial reconstruction of CT data acquired using a wide-cone system. In one implementation, frequency data may be patched in to a first scan, such as an axial scan, from a second scan, such as a helical scan. In one embodiment, an initial reconstruction may be processed (such as via a non-linear operation) to correct frequency omissions and/or errors in the reconstruction. Corrected frequency information may be utilized to improve the reconstructed image.

23 Claims, 18 Drawing Sheets

(56) References Cited

U.S. PATENT DOCUMENTS

| | | |
|---|---|---|
| 7,292,717 B2 | 11/2007 | Kohler et al. |
| 7,305,061 B2 | 12/2007 | Katsevich |
| 7,359,478 B2 | 4/2008 | Zamyatin et al. |
| 7,394,923 B2 | 7/2008 | Zou |
| 7,409,033 B2 | 8/2008 | Zhu et al. |
| 7,424,088 B2 | 9/2008 | Zamyatin et al. |
| 7,430,270 B2 | 9/2008 | Bontus et al. |
| 7,529,335 B2 | 5/2009 | Bruder |
| 7,548,603 B2 | 6/2009 | Bontus et al. |
| 7,596,203 B2 | 9/2009 | Kohler et al. |
| 7,643,605 B2 | 1/2010 | Ning et al. |
| 7,672,490 B2 | 3/2010 | Kohler et al. |
| 7,778,387 B2 | 8/2010 | Kohler et al. |
| 7,792,238 B2 | 9/2010 | Pack et al. |
| 7,889,901 B2 | 2/2011 | Bontus et al. |
| 7,929,747 B2 | 4/2011 | Chen et al. |
| 8,121,245 B2 | 2/2012 | Pan et al. |
| 2007/0297661 A1* | 12/2007 | Zhu et al. .................. 382/131 |
| 2009/0016485 A1 | 1/2009 | Nakanishi et al. |
| 2009/0116717 A1 | 5/2009 | Kohler et al. |
| 2011/0044546 A1 | 2/2011 | Pan et al. |
| 2012/0215090 A1 | 8/2012 | Pan et al. |
| 2012/0308099 A1 | 12/2012 | Benson et al. |
| 2012/0308100 A1 | 12/2012 | Zeng et al. |
| 2012/0308102 A1 | 12/2012 | Pack et al. |

OTHER PUBLICATIONS

Katsevich, A., "On Two Versions of a 3π Algorithm for Spiral CT", Phys. Med. Biol., 2004, pp. 2129-2143, vol. 49, ©IOP Publishing, Inc.

Bontus, C., et al., CEnPit: Filtered Back-Projection Algorithm for Helical CT Using an N-Pi Acquistion, Transactions on Medical Imaging, 2005, pp. 977-986, vol. 24, ©IEEE.

Kohler, T., et al., "The Radon-Split Method for Helical Cone-Beam CT and Its Application to Nongated Reconstruction", Transactions on Medical Imaging, Jul. 2006, pp. 882-897, vol. 25, ©IEEE.

Bontus, C., et al., CEnPiT: Helical Cardia CT Reconstruction, Radiation Imaging Physics, Medical Physics, 2006, pp. 2792-2799, vol. 33, issue 8, ©American Association of Physicists in Medicine.

Katsevich, A., "Theoretically Exact FBP-type Inversion Algorithm for Spiral CT", SIAM J. Appl. Math., 2002, pp. 2012, vol. 62, ©Hindawi Publishing Corp.

* cited by examiner

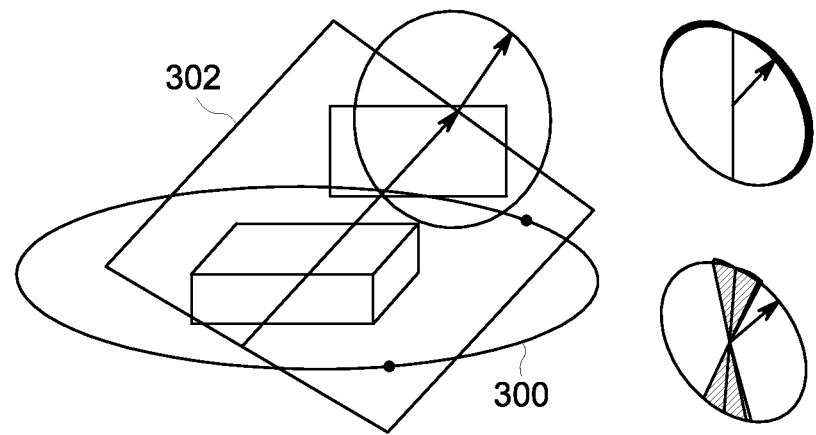
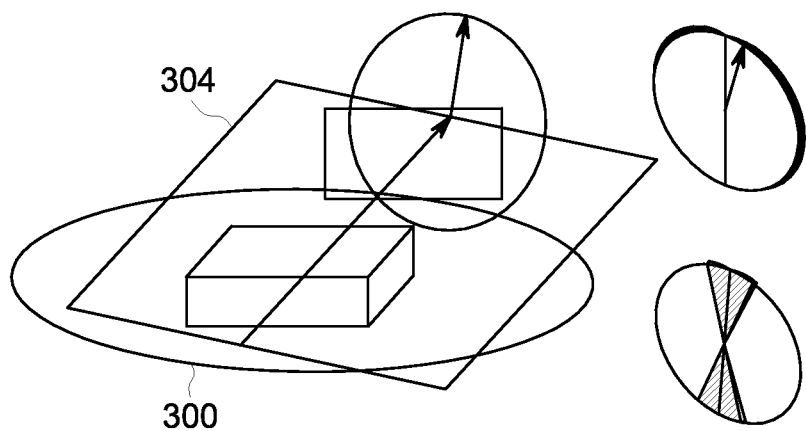
FIG. 13

METHOD AND SYSTEM FOR RECONSTRUCTION OF TOMOGRAPHIC IMAGES

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of X-rays through the target volume, to acquire image data and to construct tomographic images (e.g., three-dimensional representations of the interior of the human body or of other imaged structures). However, various physical limitations or constraints on acquisition may result in artifacts or other imperfections in the reconstructed image.

For example, third-generation cone-beam CT may suffer from cone-beam artifacts, particularly in the case of axial (circular) scan trajectories. These artifacts may arise from a variety of causes, such as truncation of data in the Z-direction (i.e., in the direction corresponding to the axis about which the X-ray source rotates about the patient), mishandled data, and/or missing frequencies

BRIEF DESCRIPTION

In one embodiment, a method of tomographic image reconstruction is provided. The method includes reconstructing a first image volume from an incomplete projection dataset and reconstructing a second image volume from a projection dataset. The difference of the first image volume and the second image volume is taken to produce a difference volume. The difference volume is projected over a set of view angles in a parallel three-dimensional geometry to produce a respective set of parallel views. Shift-variant filtration is applied to the set of parallel views to remove frequencies that are represented in at least the incomplete projection dataset to produce a set of filtered parallel views. The filtered parallel views are backprojected to produce a filtered difference volume. The filtered difference volume is added to the first image volume to produce a final image volume. Corresponding computer-readable media and system embodiments are also provided.

In a further embodiment, a method for processing tomographic projection data is provided. The method includes reconstructing an initial volume from a set of tomographic scan data. The initial volume comprises inaccurate or incomplete frequency data. A non-linear operation is applied to the initial volume to generate a modified volume from the initial volume. The non-linear operation is based on prior knowledge about the composition of an object represented in the initial volume. The modified volume is filtered to obtain a filtered volume representing a subset of the frequencies from the modified volume. The filtered volume and the initial volume are combined to generate a corrected image. Corresponding computer-readable media and system embodiments are also provided.

In an additional embodiment, a method for processing tomographic projection data is provided. The method includes reconstructing an initial volume from a set of tomographic scan data. The initial volume comprises inaccurate or incomplete frequency data. A non-linear operation is applied to the initial volume to generate a modified volume from the initial volume. The non-linear operation is designed based on prior knowledge about the composition of an object represented in the initial volume. The initial volume is subtracted from the modified volume to generate a difference volume. The difference volume is filtered to obtain a filtered volume representing a subset of frequencies from the difference volume. The filtered volume and the initial volume are combined to generate a corrected image. Corresponding computer-readable media and system embodiments are also provided.

In another embodiment, a method for processing tomographic projection data is provided. The method includes reconstructing an initial volume from a set of tomographic scan data. The initial volume comprises inaccurate or incomplete frequency data. The initial volume is segmented to generate a remainder image from which one or more high-contrast objects are removed. A frequency mask is applied to the remainder image to generate a masked image. The masked image and the initial volume are combined to generate a corrected image. Corresponding computer-readable media and system embodiments are also provided.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein:

FIG. 13 depicts further aspects of the selection of filtering lines, in accordance with aspects of the present disclosure;

DETAILED DESCRIPTION

Embodiments disclosed herein provide algorithms for the reconstruction of images from data collected using cone-beam computed tomography (CT). The algorithms address artifacts attributable to one or more of truncation of data in the z-direction, mishandled data due to incorrect data redundancy weighting, and/or missing frequency data. In accordance with certain embodiments, approaches are described for generating an initial reconstruction of CT data acquired using a wide-cone system. The initial reconstruction may be processed (such as via a non-linear operation) to generate data corresponding to missing frequencies in the reconstruction. Missing frequency information generated in this manner may be added to the reconstruction to improve the reconstructed image.

For example, in one embodiment discussed herein the reconstruction process may incorporate a priori knowledge to help address issues related to missing artifacts. For example, in medical CT, the types of materials that are expected to be observed in the patient are generally known. In most cases, a voxel can be placed into one of three general categories: soft tissue, air, and bone. If the voxels are categorized (i.e., binned) in this way, the values of the voxels can be adjusted based on the number of Hounsfield units expected for these tissue types. Particular care may be given in order to preserve those voxels that are affected by partial volume. The resulting image may have certain undesirable characteristics. For example, low contrast structures may be inadvertently smoothed out. However, many of the cone beam artifacts will also be removed (particularly those that are not near a sharp edge). This image can be reprojected along rays parallel to the x, y-plane to produce data that is substantially complete in the frequency space. These projections can then be filtered to remove frequencies that were available in the original data, and backprojected. The resulting image can then be added to the original reconstruction to produce a new image with reduced conebeam artifacts. This whole process can be iterated if desired to improve conebeam artifacts further.

The approaches disclosed herein may be suitable for use with a range of tomographic reconstruction systems. To facilitate explanation, the present disclosure will primarily discuss the present reconstruction approaches in the context of a CT system. However, it should be understood that the following discussion may also be applicable to other tomographic reconstruction systems.

Figure 1:
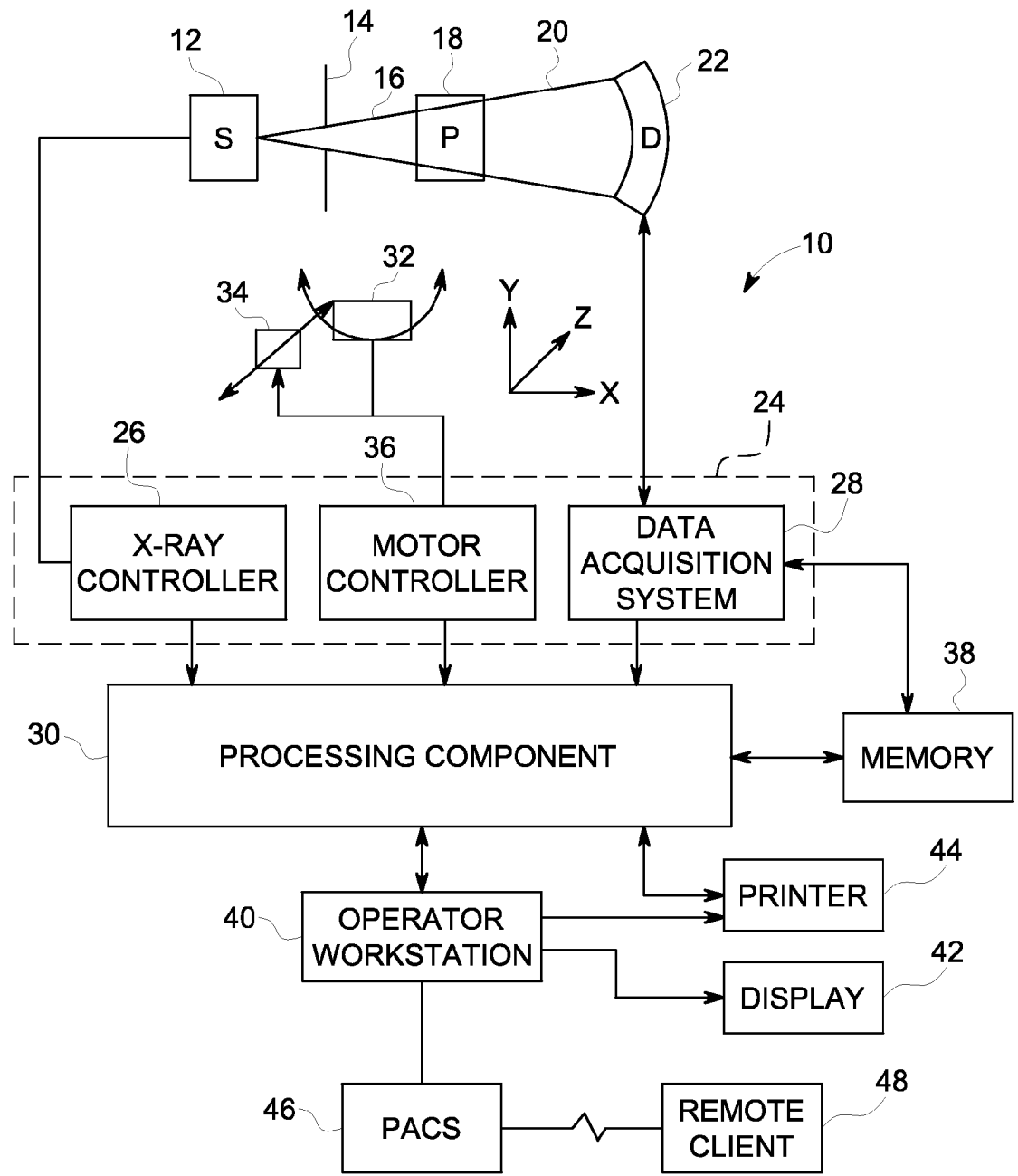
FIG. 1 is a diagrammatical view of a CT imaging system for use in producing images in accordance with aspects of the present disclosure.

With this in mind, an example of a computer tomography (CT) imaging system 10 designed to acquire X-ray attenuation data at a variety of views around a patient and suitable for tomographic reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x, y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

As noted above, the reconstruction of images from data acquired by an imaging system, such as the depicted CT imaging system 10, may be subject to various limitations that may result in artifacts or other imperfections in the generated images. For example, the acquired data may be truncated in the z-direction in certain acquisition scenarios. In particular, in an axial (i.e., circular) cone-beam acquisition, certain of the voxels in the image volume will always be in the X-ray beam during the axial spin (such as those voxels near the mid-plane i.e., plane in which the X-ray focal spot moves) while other voxels are illuminated in certain of the views during the axial spin but not in others. For example, due to the narrow portion of the X-ray cone being closer to the X-ray source 12, (that is, the cone expands or diverges as distance from the source increases) a narrow segment of voxels near the X-ray 12 source may be illuminated while those voxels furthest from the source are fully or mostly illuminated due to being near the wide base of the cone. However, as the X-ray source is rotated axially about the volume, the portions of the volume that are near and far from the X-ray source 12 will also rotate, with the result being that the extent of X-ray illumination a voxel receives may decay monotonically with distance of the voxel from the mid-plane of focal spot rotation. As a result, there is less data available with respect to the edges of the X-ray cone in the z-direction in an axial scan than for those voxels nearer the mid-plane of the cone in the z-direction. This data truncation in the z-direction may prevent the reconstruction of good quality images outside that portion of the volume which is always projected onto the detector during an axial scan.

In the case of mishandled data, any given voxel will be seen by the source and detector for a certain angular view range in a given cone-beam axial scan. However, some Radon directions or frequencies will be measured twice in such a scan. The reconstruction should correctly take into account this redundancy or artifacts may result. Simple weighting in the sinogram domain may not always meet this goal accurately and therefore more advanced filtering techniques may be useful. In certain instances, mishandled data as described herein may result in cone-beam artifacts in the reconstructed image.

In addition, in some instances where a cone-beam axial scan is employed, certain frequency information may be missing for a given voxel. For example, even inside the 360 degree region generated by a circular (i.e., axial) scan, there may be some missing frequencies, particularly along the z-direction. The amount of missing frequencies will increase with distance from the mid-plane (plane in which the x-ray focal spot moves).

Figure 2:
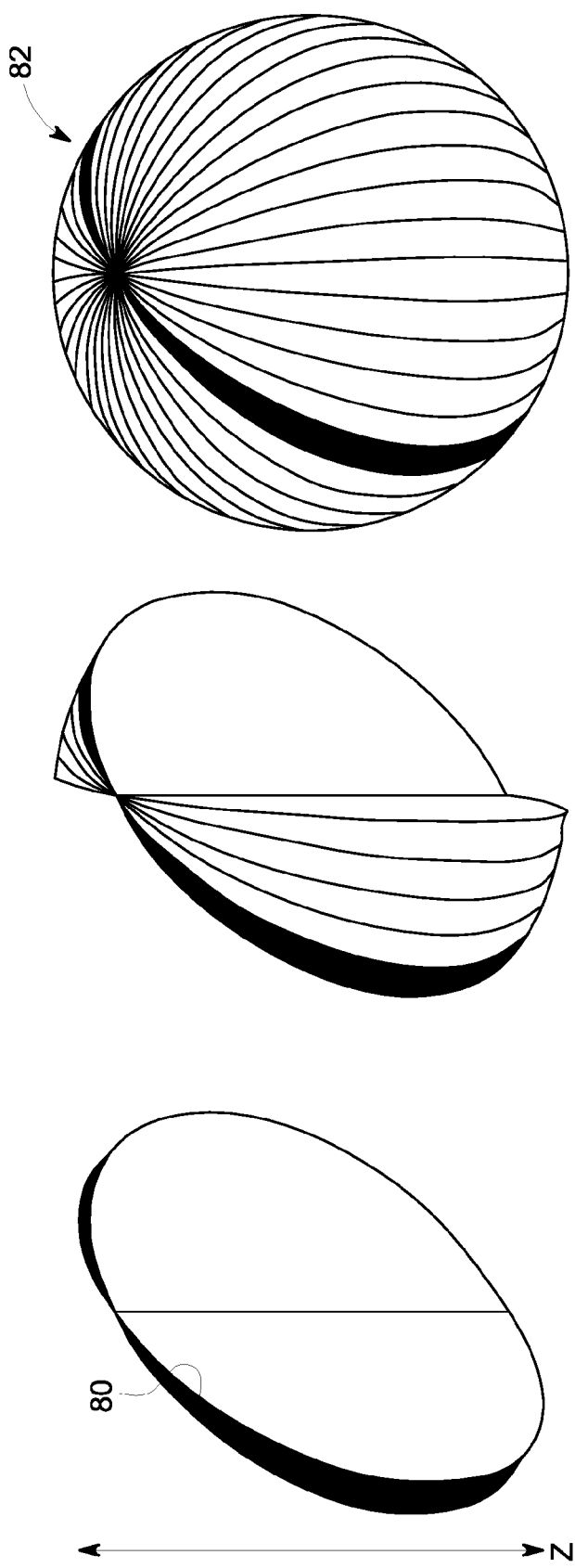
FIG. 2 depicts the sweep of a circle in frequency space to define a spherical shell.

Some or all of the above-noted issues are addressed by the approaches discussed herein. By way of introducing certain aspects of these approaches, a brief discussion of frequency analysis is provided. For example, turning to FIGS. 2-5, aspects of frequency analysis are discussed that may prove useful to understanding the present approach. In particular, in cone-beam tomography each measured (and filtered) ray contributes 3D Radon (or Fourier) information (hereafter called frequency information) in a great circle (or disk in the Fourier case) that is orthogonal to the ray. In order to get an exact reconstruction at a particular voxel, filtered rays are accumulated whose frequency contributions cover the frequency sphere uniformly. If a ray has cone angle zero, its corresponding great circle in frequency space is parallel to the z (frequency) direction. Such is the case for points that lie in the plane of the source trajectory (the scan plane). Thus, in order to get an exact reconstruction at a particular voxel in the scan plane, filtered rays should be accumulated that pass through the voxel over a 180 degree range. This can be appreciated by noting that the vertical (parallel to z) circle 80 depicted will sweep out an entire spherical shell 82 as it is rotated 180 degrees, as shown in FIG. 2.

Figure 3:
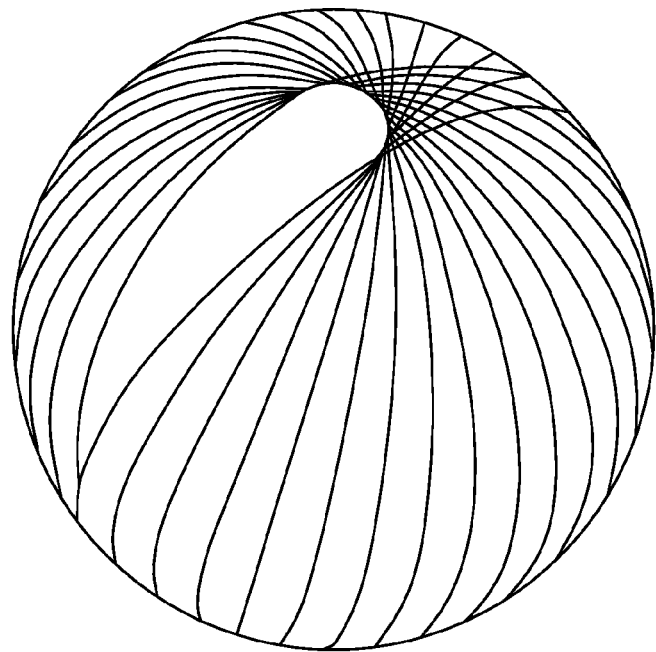
FIG. 3 depicts a region swept out by a circle in frequency space over a 180 degree range for a point outside the scan plane such that frequencies are missing.
Figure 4:
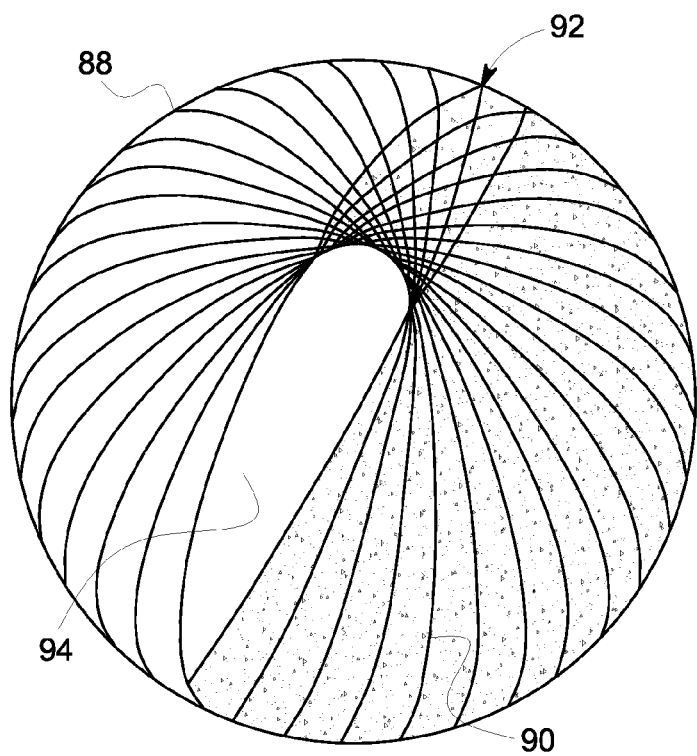
FIG. 4 depicts an alternative view of a region swept out by a circle in frequency space over a 180 degree range for a point outside the scan plane such that frequencies are missing.

For points that lie outside the scan plane, the great circle 80 is tilted off of the z-axis by the cone angle. If such data is used over a 180 degree range, the result appears as depicted in FIGS. 3 and 4. In FIG. 4, the region swept out by the two halves of each great circle is depicted with different hatching (first hatching 88 and second hatching 90) to facilitate visualization. There is a region of the sphere that is covered twice (combined hatching 92) and another region that is not covered at all (missing frequency information 94).

Figure 5:
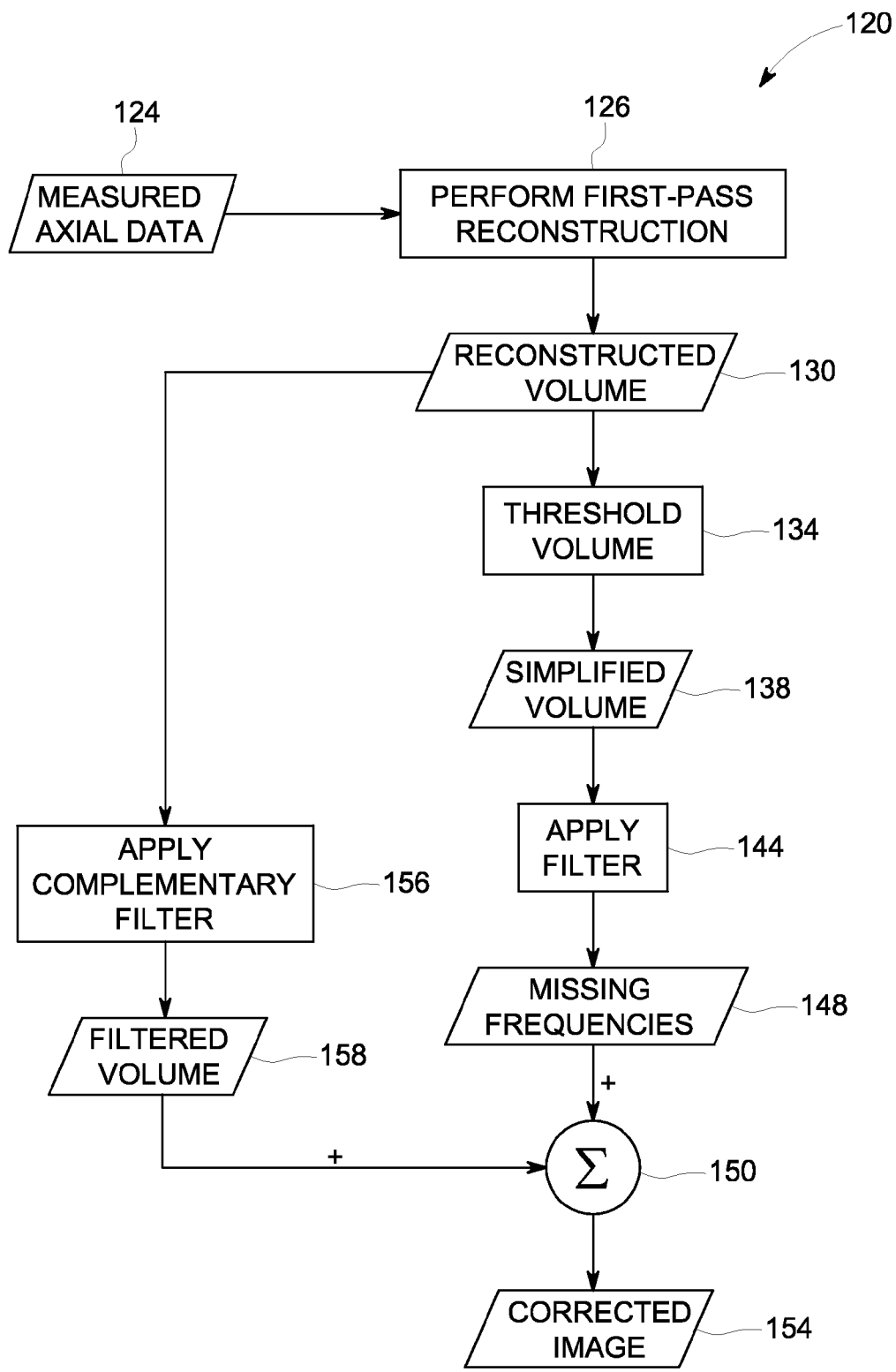
FIG. 5 depicts a flowchart describing one algorithm for implementing an image reconstruction process, in accordance with aspects of the present disclosure.

With the foregoing background in mind, a presently contemplated algorithm implementation is described by the flowchart 120 of FIG. 5. In this embodiment, measured axial data 124, such as data acquired using a cone-beam CT system, is initially reconstructed (block 126) to generate an initial reconstructed volume 130. A threshold comparison step (block 134) may be employed to generate a thresholded or simplified volume 138 (i.e., a cartoonized volume). The simplified volume 138 may include frequencies missing in the initial reconstructed volume 130 which can be used to reduce or eliminate artifacts. In the depicted implementation, the simplified volume 138 may be filtered (block 144) (or otherwise processed) to extract the missing frequencies 148. The missing frequencies 148 may be added (block 150) to the initial reconstructed volume 130 to generate a corrected volume 154. In one embodiment, such as in the depicted example, a filter complementary to the filter applied to the simplified volume at block 144 may be applied (block 156) to the initial reconstructed volume 130 to avoid duplicating some frequencies. In such an embodiment, the resulting filtered volume 158 is combined with the missing frequencies 148 to generate the corrected image 154.

Figure 6:
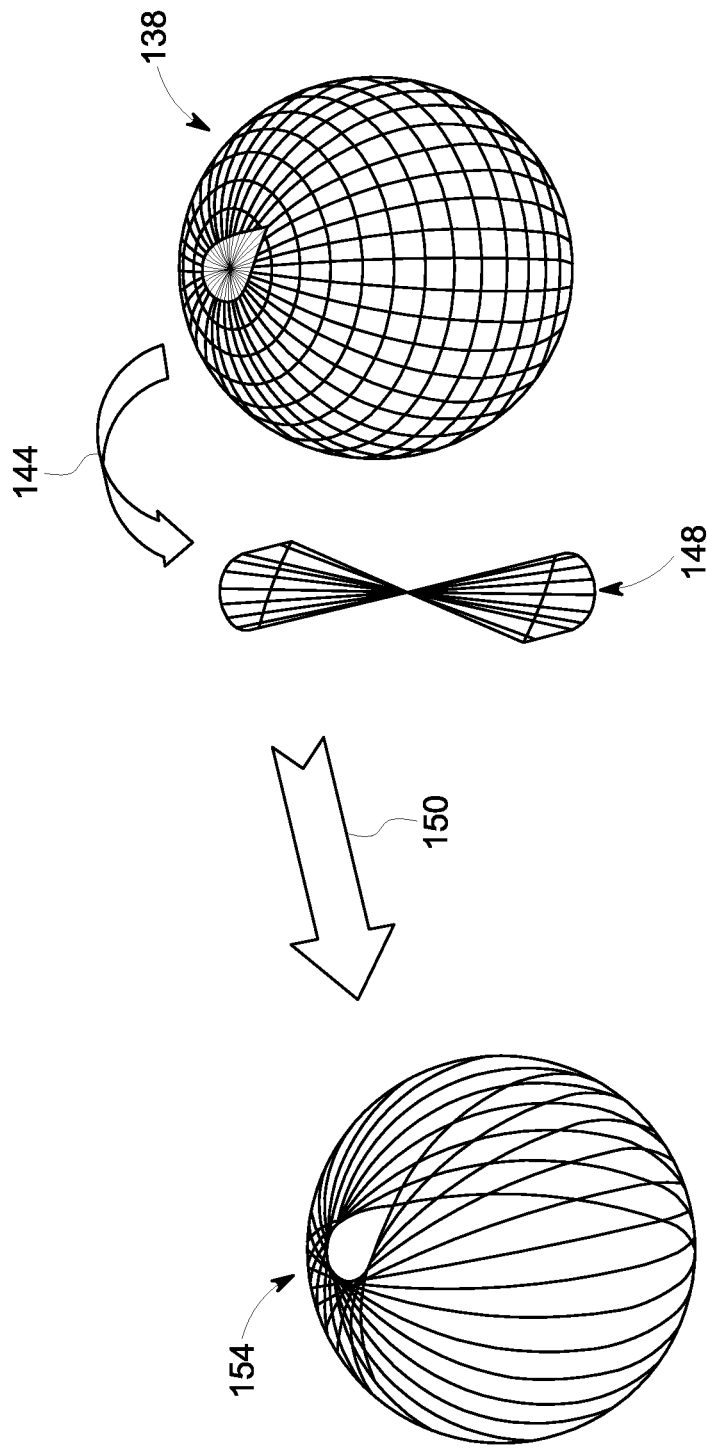
FIG. 6 graphically depicts the extraction of missing frequency data from a simplified volume and the addition of the missing frequency data to an initial reconstruction, in accordance with aspects of the present disclosure.

The above process is graphically represented in FIG. 6, which depicts an example of a thresholded or cartoonized volume (i.e., simplified volume 138) from which missing frequency data 148 is extracted, e.g., filtered 144. The missing frequency data 148 may then be added or otherwise combined with the initial reconstructed volume (or a filtered version of such a volume) to generate a corrected volume 154 that includes the missing frequency data 148. As depicted, the missing frequencies typically correspond to the "poles" of the centered, frequency domain sphere. That is, for a full circular scan, the missing frequencies fall within a double cone whose axis lies along the z-axis in frequency space.

Figure 7:
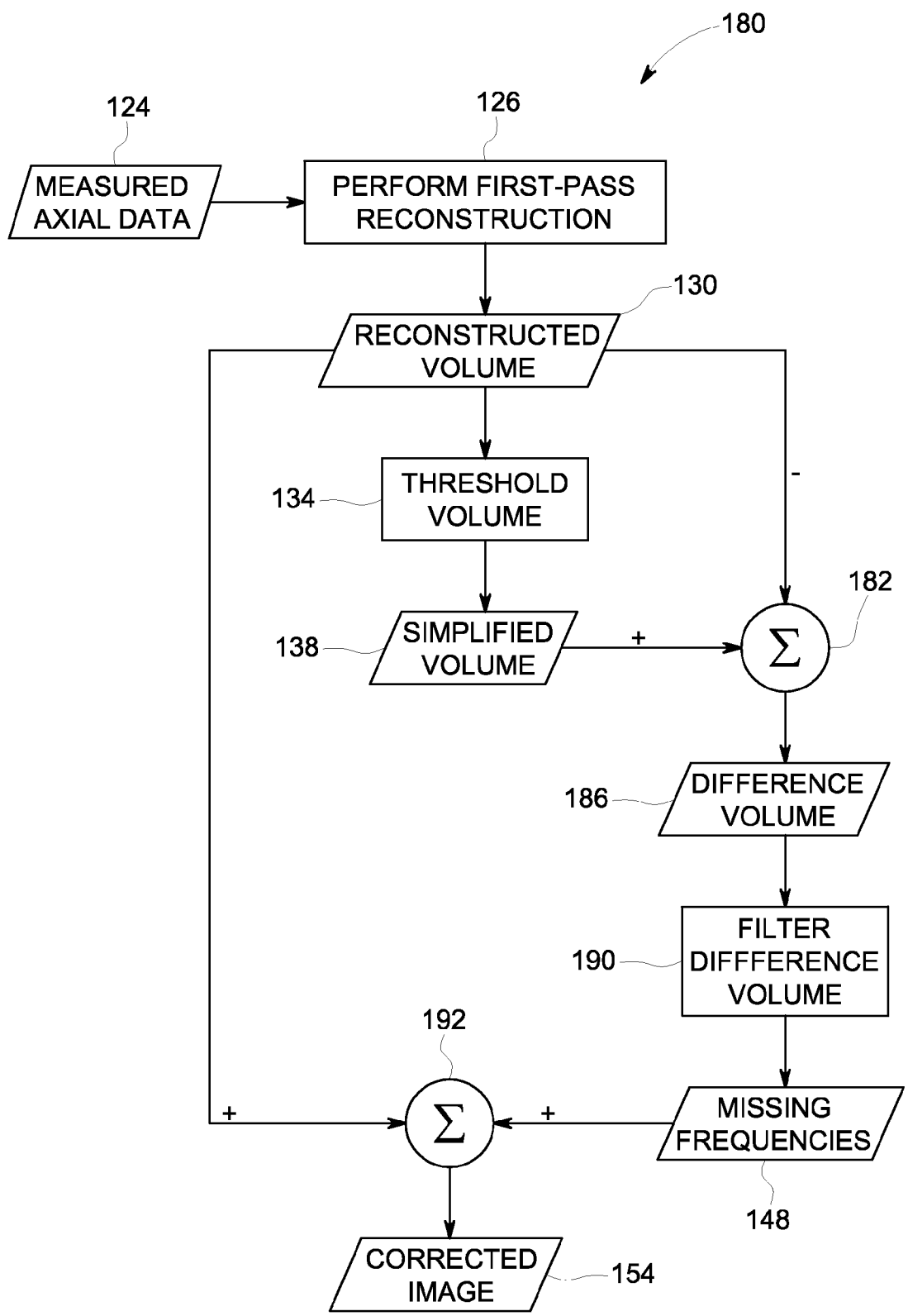
FIG. 7 depicts a flowchart describing another algorithm for implementing an image reconstruction process, in accordance with aspects of the present disclosure.

An alternative implementation of this approach is depicted by flowchart 180 of FIG. 7. In this alternative implementation, the initial reconstructed volume 130 is subtracted (block 182) from the simplified volume 138 to generate a difference volume 186. The missing frequencies 148 may be extracted or otherwise selected from the difference volume 186 (such as by a filtering step 190) and added (block 192) to the initial reconstructed volume 130 to generate the corrected volume 154.

Figure 8:
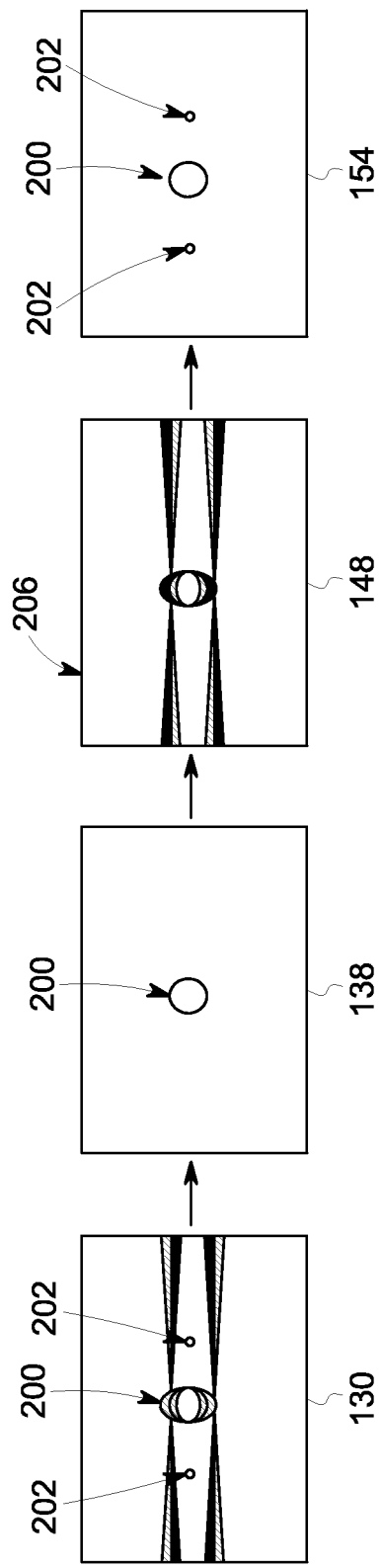
FIG. 8 depicts a pictorial representation of artifact removal in accordance with a presently contemplated algorithm.

A pictorial example is shown in FIG. 8 based on a larger high-contrast sphere 200 and two smaller low-contrast spheres 202. The initial reconstructed volume 130 has severe cone-beam artifacts or missing z-frequencies which appear as planar streaks perpendicular to the (vertical) z-axis. The simplified volume 138 (generated by a threshold operation) contains only the high-contrast sphere 200, having removed both the streaks and the low-contrast objects 202 by operation of the threshold. The correction term 206 computes the effect of missing frequencies 148, which are similar to the inverse of the real artifacts. The correction term 206 (i.e., missing frequencies 148) are added to the initial reconstructed volume 130, resulting in a corrected image 150 without artifacts.

With respect to the generation of the simplified (i.e., "cartoonized") volume 138, in one implementation, recovery of missing data utilizes prior knowledge of the object being scanned. In the case of medical (and many other) CT images, this prior knowledge can include an assumption that the image is sparse in the histogram domain (i.e., that the true, i.e., artifact-free, image is dominated by voxels with values that are close to a small set of discrete values). For example, medical images typically include voxels having an intensity corresponding to air, water, lung, soft tissue, fat, and/or bone. Variations from this model that fall within the missing frequency region are likely artifacts.

Figure 9:
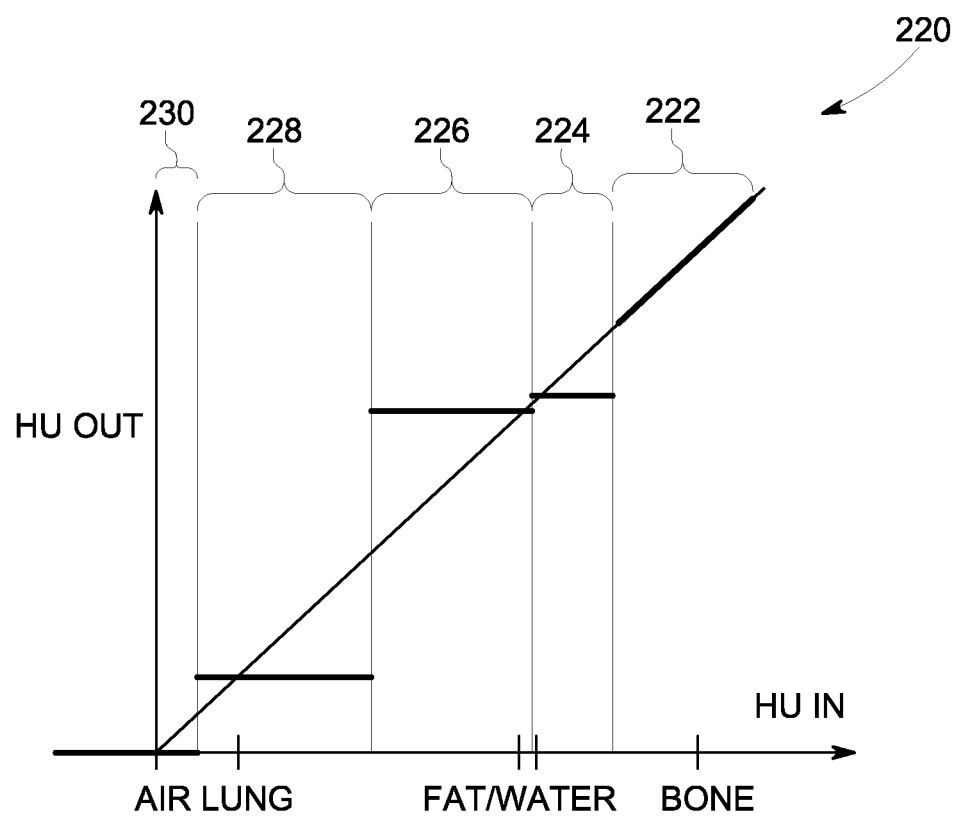
FIG. 9 depicts an example of a non-linear operation for categorizing voxels in accordance with aspects of the present disclosure.

The above observations suggest one mechanism for forming the simplified volume 138. In accordance with this approach, each voxel is categorized as one of air, lung, soft tissue or bone. The intensities of each voxel are modified according to a set of rules for that tissue type. If the categorization of a given voxel is done strictly based on comparing the voxel intensity to a set of thresholds, the two steps (categorization and modification) can be combined into a single non-linear function 220, as depicted in FIG. 9.

In the depicted example of a non-linear function, the Hounsfield (HU) values of the bone 222 are left unchanged. This is because the HU values of bone are much less uniform than the HU values of the other tissue types. Fortunately, bone tends to be a small percentage of the overall voxels so the impact of not having a stable intensity to assign to bone voxels is generally not too problematic. Unlike the values for bone 222, the values for voxels classified as water 224, fat 226, lung 228, or air 230 are set to defined values in the depicted example of a non-linear function, though this may vary in other suitable functions. Furthermore, if the artifact reduction of the present approach is insufficient, it can be applied multiple times (i.e., iterated). In this case, the initial reconstruction 130 is still used to provide the non-missing frequencies, but the thresholding is applied to the latest image estimate.

As will be appreciated in the above discussion, the above approaches may be based on quantizing (such as by the above non-linear function) an initial reconstruction 130 of an image and adding back into the reconstruction process frequencies introduced by the quantization process wherever there are frequencies missing in the original reconstruction 130. As will be appreciated, other approaches to generating the missing frequencies may be employed than those discussed above. In particular, various non-linear operations may be employed to introduce otherwise missing frequencies, image quantization being only one example of such a process.

Examples of non-linear operations that may be employed to introduce the missing frequencies include, but are not limited to histogram binning, image compression, anisotropic diffusion, reconstruction from wavelet maxima, a total variation reduction step, and/or a segmentation step combined with assigning synthetic voxel values in each segmented region. With respect to these approaches, image quantization is merely one example of a type of histogram binning in which the bins are selected to be representative of values in the image range (as depicted and discussed with respect to FIG. 9). However, histogram binning is a more general tool and it can be applied to purposes other than quantization. For example, histogram binning may be applied in the present context to perform histogram transformations yielding images with the desired properties in the distribution of image values.

As used herein, histogram binning may be understood, in its simplest form, to constitute one or more steps by which all voxel values in a volume within each of a number of value ranges are set to a certain pre-defined value within that range. For example, all voxels with a value less than or equal to 200 Hounsfeld units might be modified to be 0 HU. Similarly, all voxels with a value between 200 and 500 could be set to 300 HU and those voxels that are between 500 and 1400 could be set to 1000 HU. There are variations to histogram binning that may be employed. For example, transition regions can be introduced at bin boundaries such that the transfer function is not discontinuous. Also, the bin boundaries and even the number of bins can be changed from one iteration to the next. Also, the image can be smoothed after applying histogram binning.

With respect to image compression, image quantization is often employed in compression algorithms. Therefore, one possibility for introducing non-linearities in the form of missing frequencies is to apply a full compression algorithm rather than just an image quantization step.

Another approach may be to apply a spatially variant filter to the image (as discussed in greater detail below). In particular, anisotropic diffusion, which smoothes the image in directions orthogonal to the image gradient, introduces non-linearities and reduces noise, while at the same time avoiding blurring across edge boundaries.

Yet another approach is to employ reconstruction from wavelet maxima, or comparable approaches, in which a wavelet decomposition is applied to the image and high-frequency components that do no correspond to local maxima of the gradient magnitude along the gradient direction are eliminated. This is a non-linear operation which produces sharp images, preserving well-localized edges while removing noisy-oscillating edges.

With respect to the filtering steps discussed above, a suitable algorithm may accomplish the filtering in a number of different ways. For example in one implementation of an algorithm as discussed herein, the act of filtering may be performed as a shift-invariant operation. In other implementations, however, the act of filtering may be performed as a shift-variant operation.

In an example where an algorithm employs a shift-invariant filtration step, the algorithm may be described as being frequency-based. In such an embodiment, the filtering step can be implemented as follows. A three-dimensional fast Fourier transform (FFT) of the image (e.g., simplified volume 138) is initially taken. The frequencies that may be missing due to the incompleteness of a circular trajectory are preserved while other frequencies are eliminated. In embodiments where a complementary filter is employed, the complementary filter is implemented in much the same fashion as the standard filter, with the difference being that the regions corresponding to the missing frequencies (e.g., the poles of the centered, frequency domain sphere) are eliminated and it is the non-missing frequencies (e.g., the non-polar regions) that are retained.

One limitation of the frequency-based approach is that the true set of missing frequencies is not the same for different positions in the image volume. For example, voxels in the plane of the circular scan do not have any missing frequencies, while those farthest from the scan plane are missing the most. In addition, the set of missing frequencies varies within a single axial plane not only because the various cone angles shift, but because some locations fall outside the X-ray beam at some views. This issue may be addressed in two different ways.

First, the region defining the missing frequencies may be defined liberally so as to accommodate all or most of the frequencies that are missing in any image location. In other words the range of missing frequencies may be overestimated so as to ensure coverage of most or all of the missing frequencies at different locations in the images. There may be a tradeoff to this approach since, in the regions that have a small set of missing frequencies, it is better to use measured frequencies than it is to use recovered frequencies.

Alternatively, the image volume can be partitioned into slabs or sections (that may or may not overlap) that have similar missing frequency ranges. A respective shift-invariant correction may then be applied within each slab. The slabs may be blended together in any regions that overlap. This approach may involve the calculation of several correction terms and/or FFTs for the entire volume and thus may benefit from sufficient computational resources.

In an example where an algorithm employs a shift-variant filtration step, the algorithm may be described as being projection-based. As explained above, the set of frequencies that are unmeasured (i.e., the missing frequencies) depends on the location within the 3D volume for a circular cone beam scan. In other words, the combination of cone-beam projection and reconstruction acts like a shift-variant filter rather than a shift-invariant one. Projection-based algorithm implementations are designed to handle this in an efficient manner.

In one such projection-based approach, the shift-variant filter implementation first projects the image using a 3D parallel beam projection. A shift-variant filter is then applied in the projection domain and the result is backprojected. The low frequency nature of the missing frequencies may also be leveraged in the x-y directions by smoothing and downsampling up front and then upsampling and interpolating at the end. This may be done to improve computational efficiency.

Figure 10:
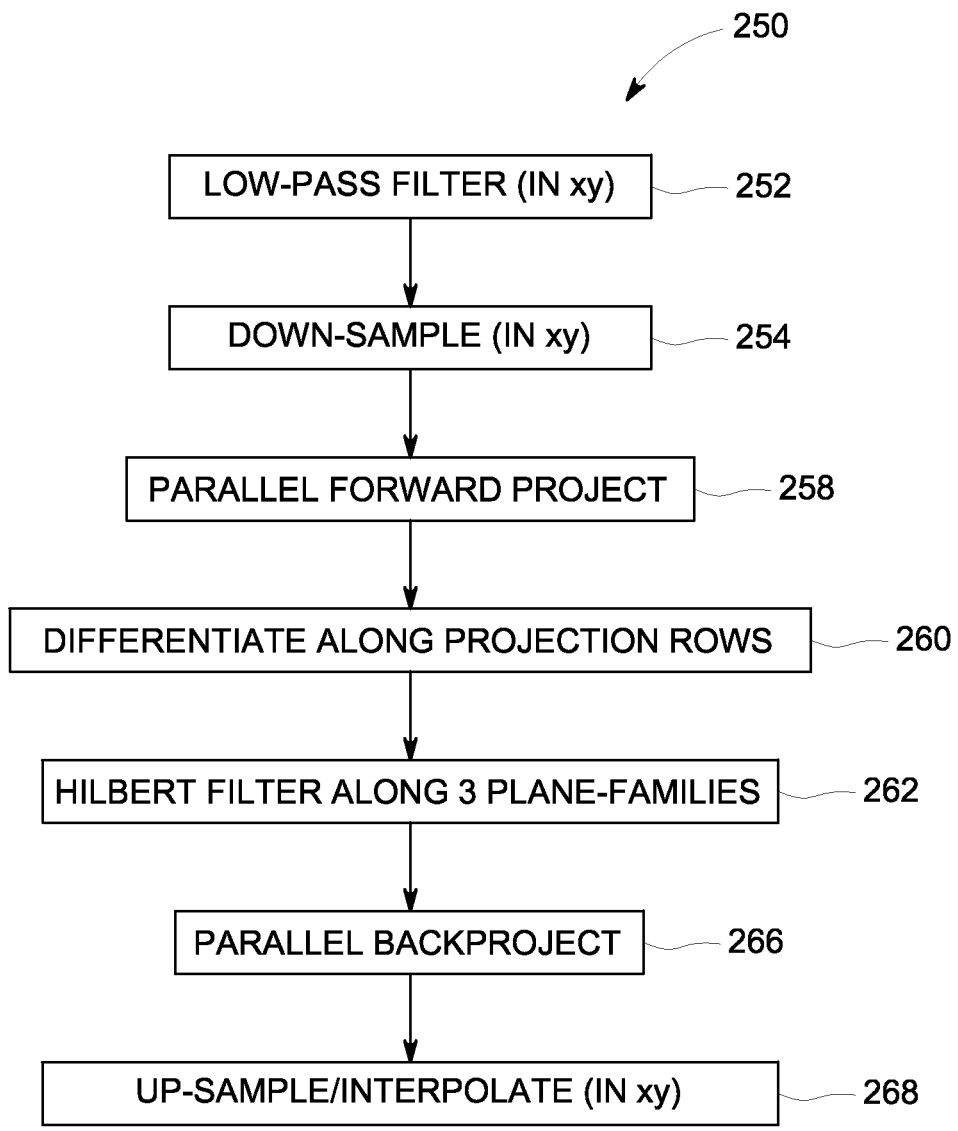
FIG. 10 depicts a flowchart describing a shift-variant filtration scheme, in accordance with aspects of the present disclosure.

A flowchart 250 depicting one such implementation of a shift-variant filtration scheme is depicted in FIG. 10. In the depicted flow, a low pass filter is applied (block 252) to the simplified volume 138 in the x and y directions. In one implementation, this filtration is done by zeroing out high frequencies after taking a 2D FFT. The simplified volume 138 is then downsampled (block 254) in the x and y directions. The simplified volume 138 may then undergo a parallel forward projection (block 258). Each image can be processed independently to produce a row of the 3D sinogram since the projection may be performed as a parallel operation. Due to the low frequency nature of the image in x and y, in one implementation the projection can be done using very few detector columns and a reduced number of views over a 180 degree range. Either a distance driven forward projection or a ray driven forward projection may be employed. A derivative 278 may be taken (block 260) along the rows of the parallel projection data. This can be accomplished, in one embodiment, as a simple finite difference which causes a ½ pixel shift in each row. As discussed in greater detail below, a Hilbert filter may be applied (block 262), followed by a parallel backprojection (block 266). The backprojection may be implemented as a pixel-driven backprojection or as a distance-driven backprojection. In one embodiment, each row of the 3D sinogram can be processed independently to produce an image since the backprojection is a parallel operation. The result may then be upsampled and interpolated (block 268).

With respect to the application of the Hilbert filter (block 262), at this step each view of the 3D sinogram is filtered with a Hilbert kernel along three sets of lines. The result is that the data in the measured region (those corresponding to planes that intersect the trajectory) are removed while the data in the unmeasured region is preserved. In particular, with respect to the mathematics of the Hilbert filter in the frequency domain, the derivative corresponds to a multiplication by $j(\omega \cdot f)$, where $\omega$ is the frequency, f is the direction of the derivative (along the rows) and j is the square root of −1. The Hilbert filter corresponds to the multiplication by −j sgn(ω·h) where h is the direction of the Hilbert filter. The result is either +1 or −1 times the ramp filter along f (i.e., |ω·f|) depending on the direction of ω relative to f and h. Specifically, if sgn(ω·f)=sgn (ω·h), the result is the same as the ramp filter, otherwise it is the negative ramp filter.

Figure 11:
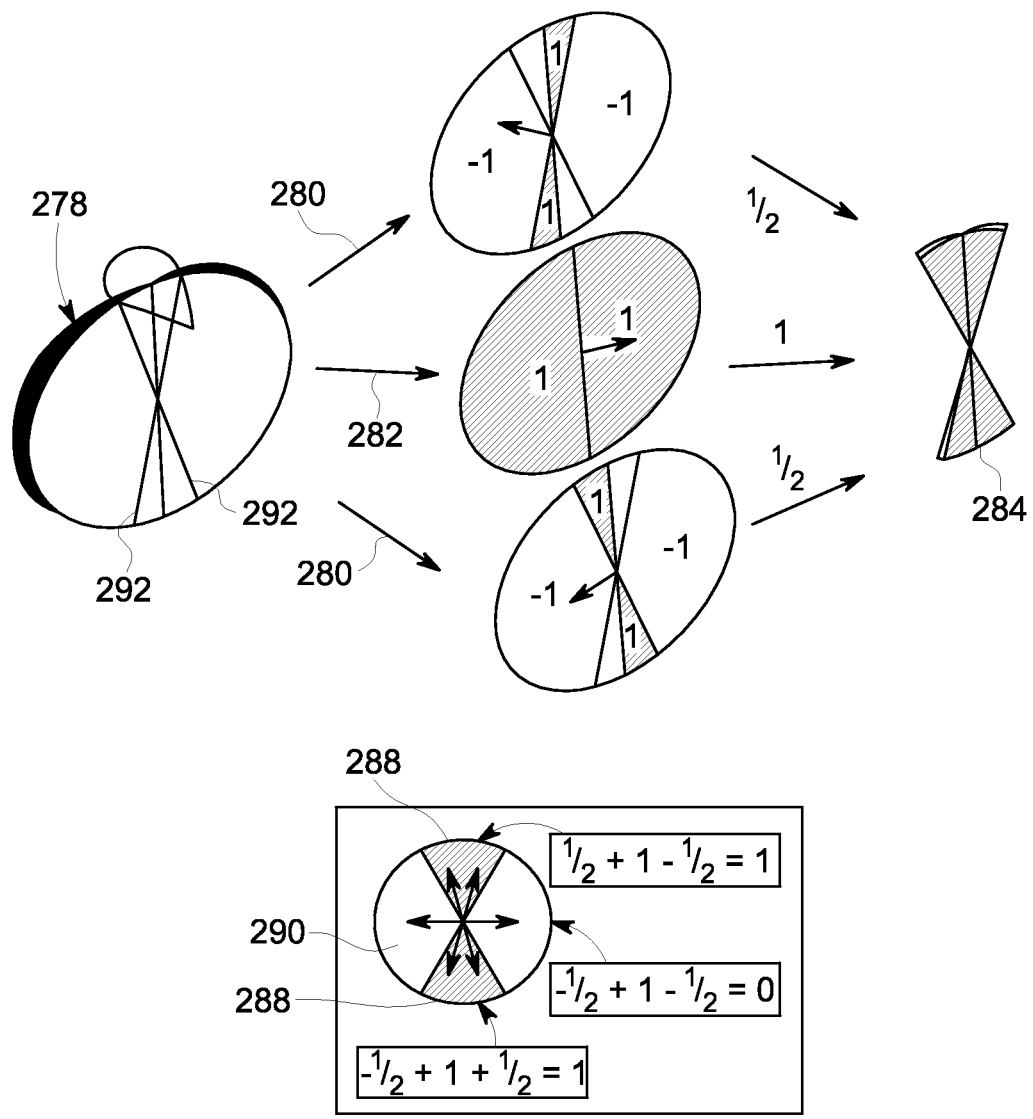
FIG. 11 graphically depicts aspects of a filtration scheme, in accordance with aspects of the present disclosure.

As visually depicted in FIG. 11, the filtration is done in three directions: the two directions at the boundary of the missing data region 280, and the direction of the derivative 282, i.e.: horizontal. These three can then be weighted and added together to produce the desired result 284. In the missing frequency region 288 the result is ½+1−½=1 or −½+1+½=1. In the non-missing frequency region 290, the result is −½+1−½=0.

Figure 12:
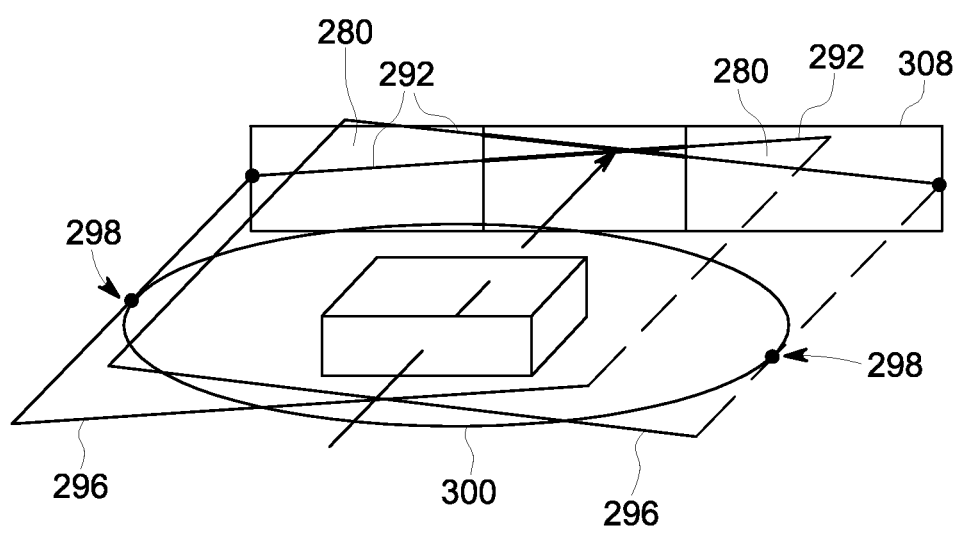
FIG. 12 depicts the selection of filtering lines, in accordance with aspects of the present disclosure.

With respect to the selection of the two tilted filtering lines 292 bounding missing data region 280, a filtering plane 296 is defined corresponding to a filtering line as the plane containing the given filtering line 292 that is parallel to the projection direction. Filtering lines 292 may be selected such that the corresponding planes 296 lie at the boundary of those that are measured and those that are not measured. A plane 296 is measured if it intersects the source trajectory 300. In the full-scan case, these planes 296 are tangent 298 to the trajectory, as depicted in FIG. 12.

By way of further example, by saying a plane lies at the boundary of those that are measured, this means that, if two planes are selected, one that was tilted a bit more (plane 302) and another that was tilted a bit less (plane 304), one of the two would intersect the trajectory 300 and the other would not. The plane 302 that intersects the trajectory 300 would be a measured plane (or a plane corresponding to measured frequencies), while plane 304 would not. This is visually depicted in FIG. 13.

The filter lines 292 correspond to the critical planes that bound these two plane types. The full set of critical planes that are parallel to a given projection direction can be divided into two sets, one in which the set of planes share a common line that contains one tangent point and the other in which the set of planes share a common line (parallel to the projection direction) that contains the other tangent point. Consequently, the set of filtering lines 292 for a given view can be constructed by projecting the two tangent points onto the virtual detector 308 for that projection direction and creating the two families of lines that intersect at these two points. For a full scan these lines are theoretically the same for every projection direction.

These lines may be adjusted depending on the actual scan protocol and the reconstruction algorithm used for the first-pass reconstruction. For example, in one implementation it may be suitable to project a pair of source locations that are 180 degrees apart from the perspective of the voxel. In one such implementation, this pair of source locations may also be aligned with one of eight (or more) view portion boundaries associated with a reconstruction algorithm. An issue that may arise in such an implementation is that now the projected point is different for different locations in the volume. Indeed, to completely patch in all missing frequencies (i.e., to avoid under-patching) while not patching in frequencies that are already present in the initial reconstruction (i.e., to avoid over-patching), the filtration may become complex.

Figure 14:
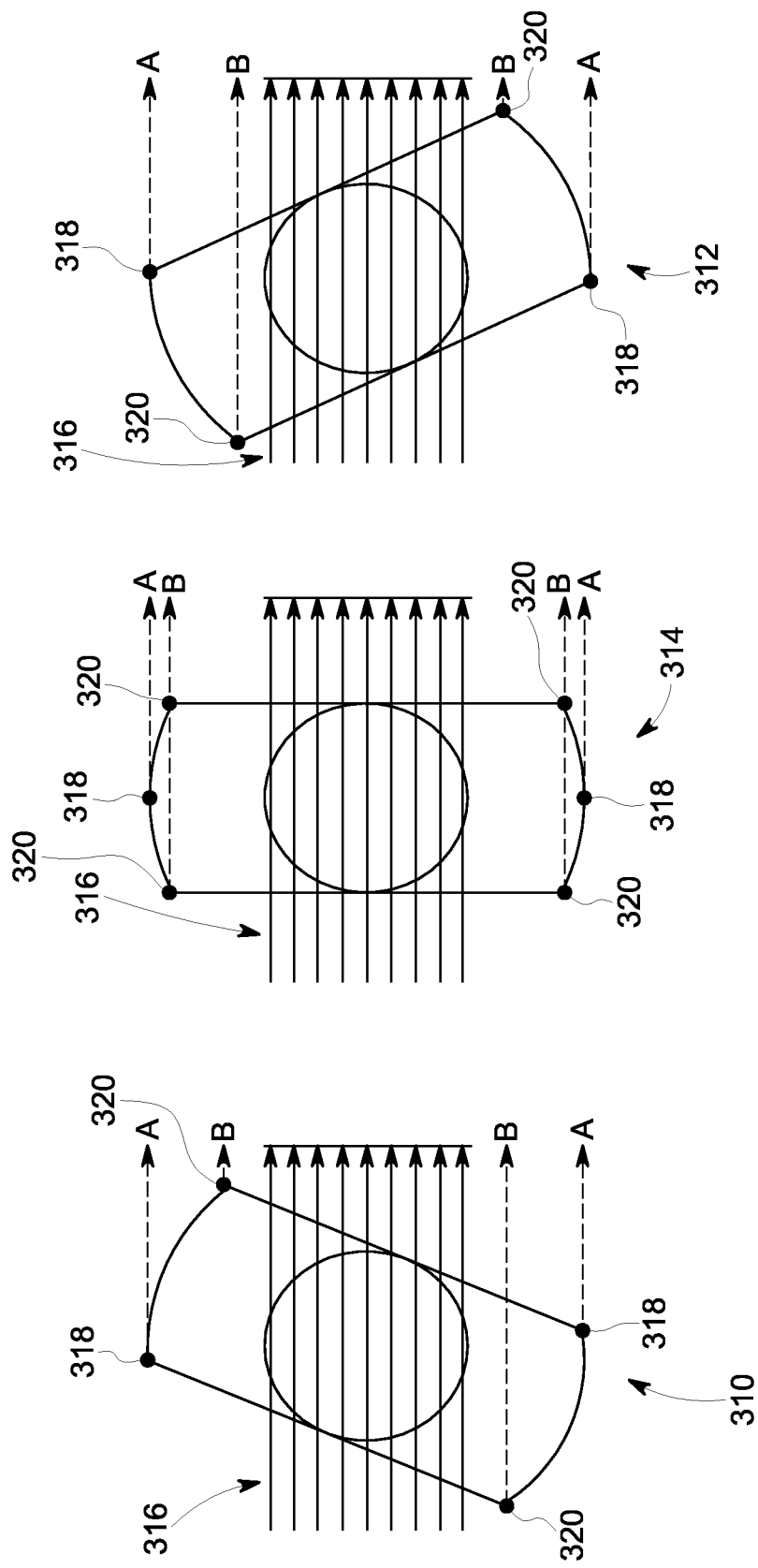
FIG. 14 depicts one embodiment for selecting a set of filtering lines, in accordance with aspects of the present disclosure.

To minimize under-patching and over-patching while at the same time allowing the use of shift-variant filtration in the projection, one approach may be to use a set of three families of filtering lines. For example, in an implementation in which the reconstruction involves the reconstruction of eight different view portions, the frequencies corresponding to any given parallel view angle will be (effectively) extracted from a reconstruction using 180 degrees of cone-parallel views. Depending on the view angle, the starting view and ending view of the 180 degree set will be somewhere within 22.5 degrees on either side (offsets 310, 312) of being orthogonal 314 to the projection direction 316, as depicted in FIG. 14.

In the orthogonal case 341 (0 degrees) all points in the field-of-view correspond to start views and end views that project near the same location (the distance between A and B is small). To avoid over-patching, the points can be selected that are farthest from the center for filtering (i.e., the A points 318). However, this approach will result in some under-patching. Alternatively, the points can be selected that are closest to the center (i.e., the B points 320). This will prevent under-patching but will result in some over-patching. In general, under-patching may be less desirable than over-patching, but it may still not be a good trade-off to introduce substantial over-patching in the center of the field-of-view in order to avoid some small or minimal amount of under-patching at the edge of the field-of-view.

Other possible approaches for addressing the under-patching/over-patching trade-off may be employed. For example in one implementation, full scan filtering may be applied with the filter focus at the source isocenter distance (SID) to prevent over-patching. Alternatively, the filter line focus maybe placed at the maximum distance (e.g., approximately 69% SID) to avoid under-patching. Similarly, the filter may be set at some fixed distance between the distances mentioned above that is chosen to avoid under-patching within a given field-of view and/or the focal distance may be adjusted based on the view angle. In addition, multiple filtering steps may be employed for different regions in the image.

Figure 15:
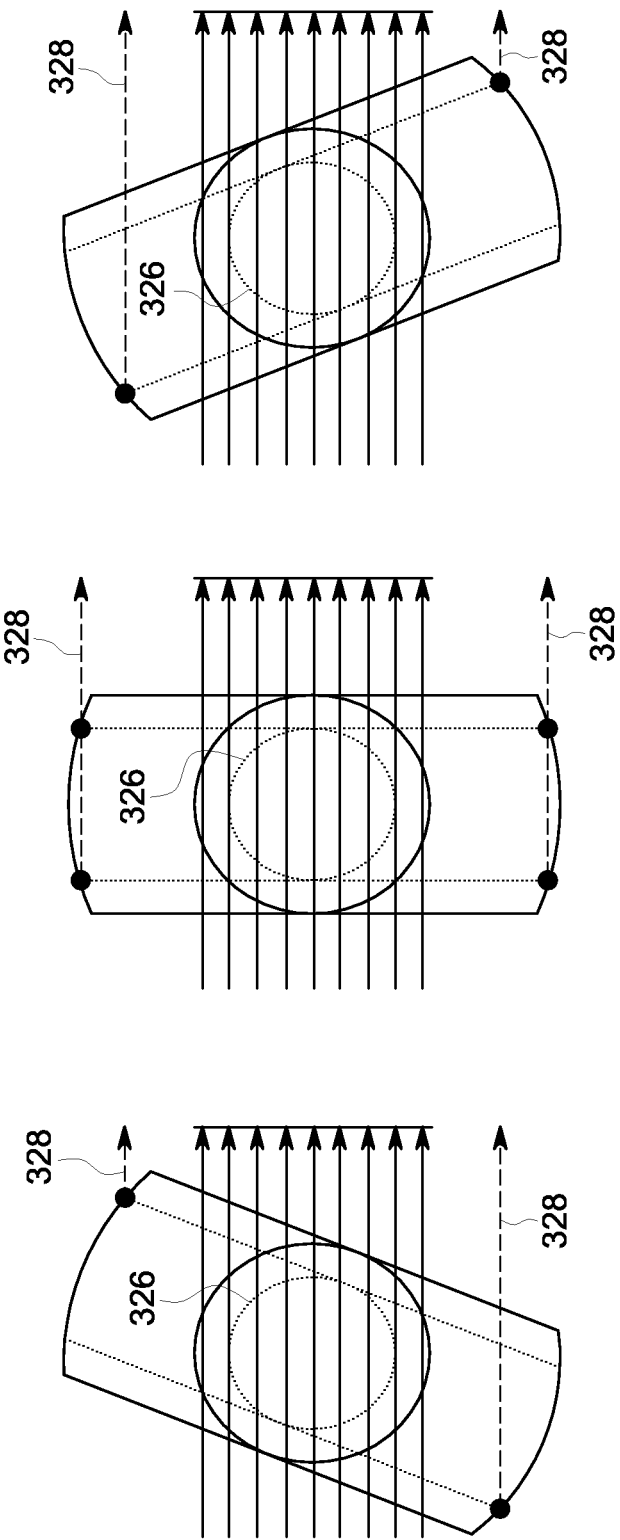
FIG. 15 depicts an implementation for selecting a set of filtering lines, in accordance with aspects of the present disclosure.

With respect to an approach where the filter is set at a fixed distance chosen to avoid under-patching within a given field-of view 326 and where the focal distance is adjusted based on the view angle, in one such implementation, a field-of-view 326 may be chosen and the largest focal distance selected at each view angle that ensures that there is no under-patching within that field-of-view 326. For example, turning to FIG. 15, the filtering lines would intersect at the ends of the dashed arrows 328.

In another implementation, other actions may be performed to reduce over-patching without adding too much complexity. For example, the maximum cone angle of rays that are measured is known and the angle of these rays projected onto the detector can be computed. There is no reason for the filtering planes to be steeper than this angle for points where there is no missing frequency data. As a result, the steepness of our filtering lines can be limited to a tan(tan (max_cone)/cos(del)), where del is the offset angle noted above (e.g., between −22.5 and 22.5 degrees).

Figure 16:
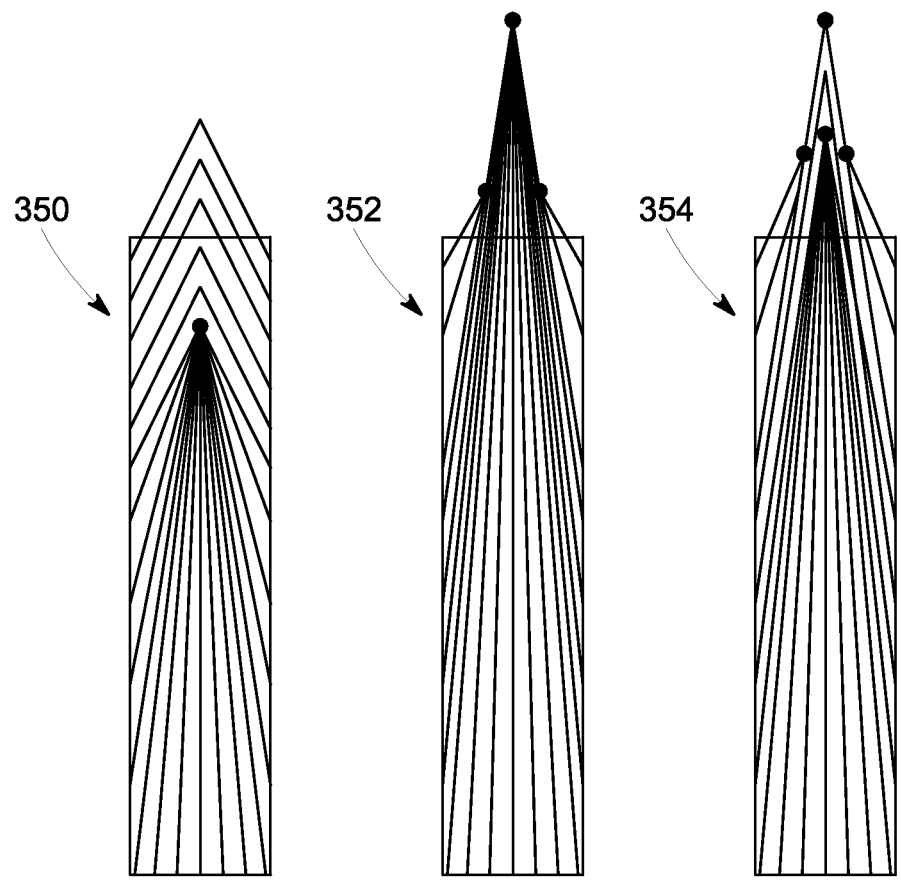
FIG. 16 depicts the various sets of filtering lines in which the steepness of the lines is increased to account for z-truncation, in accordance with aspects of the present disclosure.

The steepness of the lines may be increased to account for z-truncation in regions of the volume that fall outside the measured cone of X-rays for some views. One such approach is to define two additional points and ensure that all lines are steep enough that they intersect the line segment between these two points. For example, turning to FIG. 16, a first set of filtering lines 350 ensures that the view angle is never above some maximum view angle. The second set of filtering lines 352 ensures that all filtering lines intersect a certain line segment. This helps to patch in additional data for the truncation regions. Finally, the third set of filtering lines 354 combines both of these techniques, which may be an optimal approach in certain embodiments. In one embodiment, a suitable set of filtering lines may be generated by minimizing a cost function that penalizes under-patching by some factor (e.g., six times) more than over-patching. This type of computation could optionally be run for every view angle.

Figure 17:
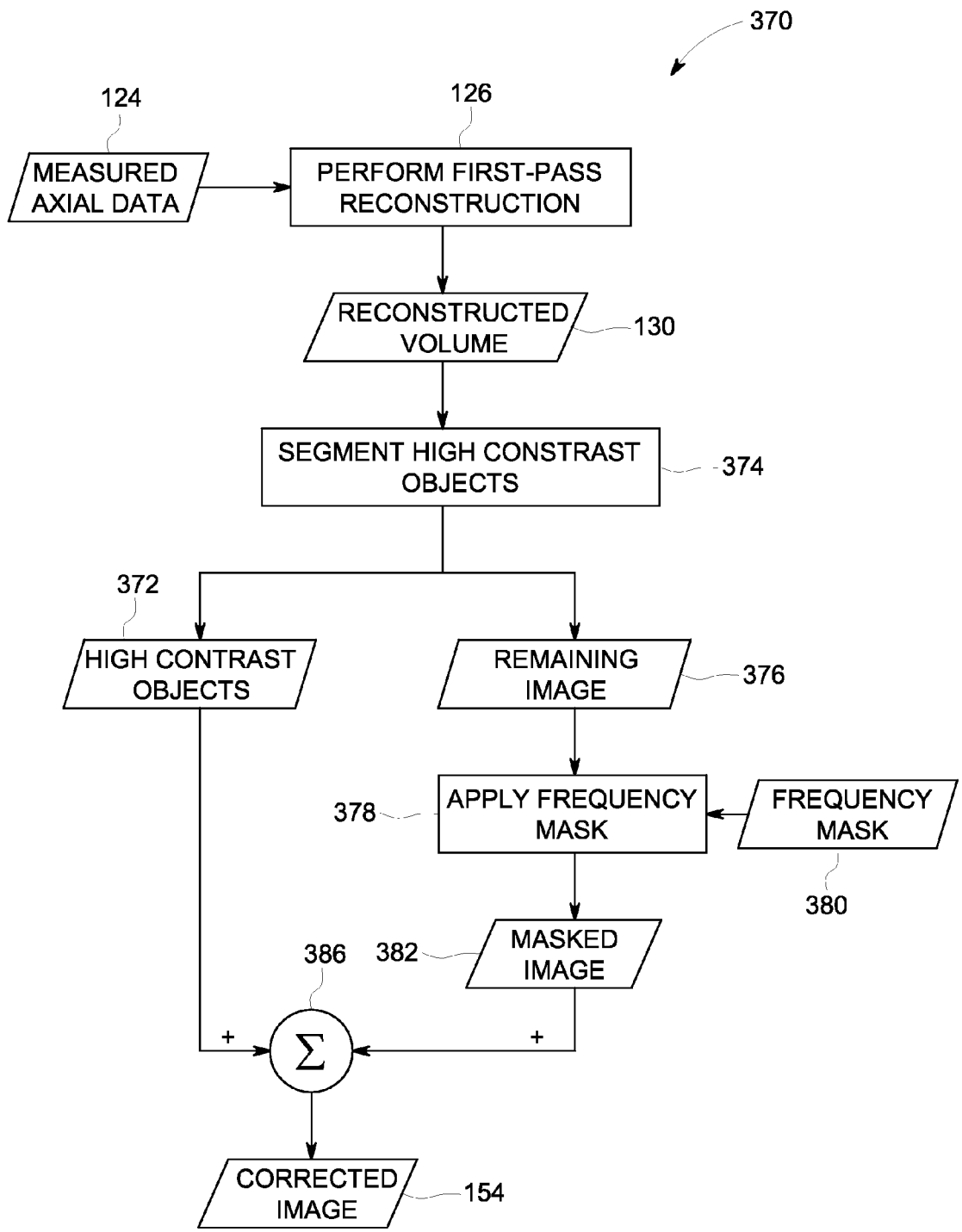
FIG. 17 depicts an additional flowchart describing another algorithm for implementing an image reconstruction process, in accordance with aspects of the present disclosure.

One alternative algorithm for addressing the missing frequency issue is depicted in FIG. 17. As depicted in the flowchart 370 of FIG. 17, in accordance with this approach, after the first-pass reconstruction (block 126) the high-contrast objects 372 are segmented and extracted (block 374), i.e.: either replaced by a pre-defined value, or a pre-defined value is subtracted. The remaining image 376 only contains lower-contrast objects and artifacts (corresponding to z-frequencies). The z-frequencies (and therefore the artifacts) may be eliminated, such as by applying (block 378) a suitable frequency mask 380, to generate a masked image 382 in which z-frequency related artifacts are removed. Then the high-contrast objects 372 are added (block 386) to the masked image 382, resulting in a corrected image 154.

Figure 18:
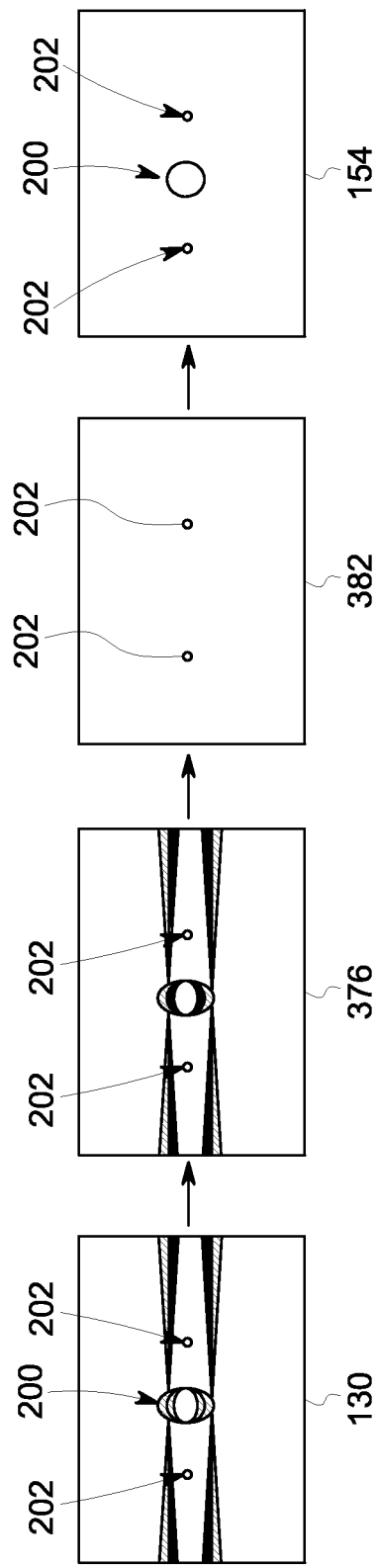
FIG. 18 depicts a pictorial representation of artifact removal in accordance with another presently contemplated algorithm.

A pictorial example is shown in FIG. 18 based on a larger high-contrast sphere 200 and two smaller low-contrast spheres 202. The initial reconstructed volume 130 has severe cone-beam artifacts or missing z-frequencies which appear as planar streaks perpendicular to the (vertical) z-axis. The high-contrast sphere 200 is extracted (such as by a thresholding operation) leaving the low-contrast objects and artifacts unchanged (i.e., remaining image 376). The z-frequencies are then suppressed (e.g., masked) to eliminate the artifacts while preserving the low-contrast objects (i.e., low-contrast spheres 202) in the masked image 382. Then the high-contrast sphere 200 is re-inserted to generate the corrected image 154.

Figure 19:
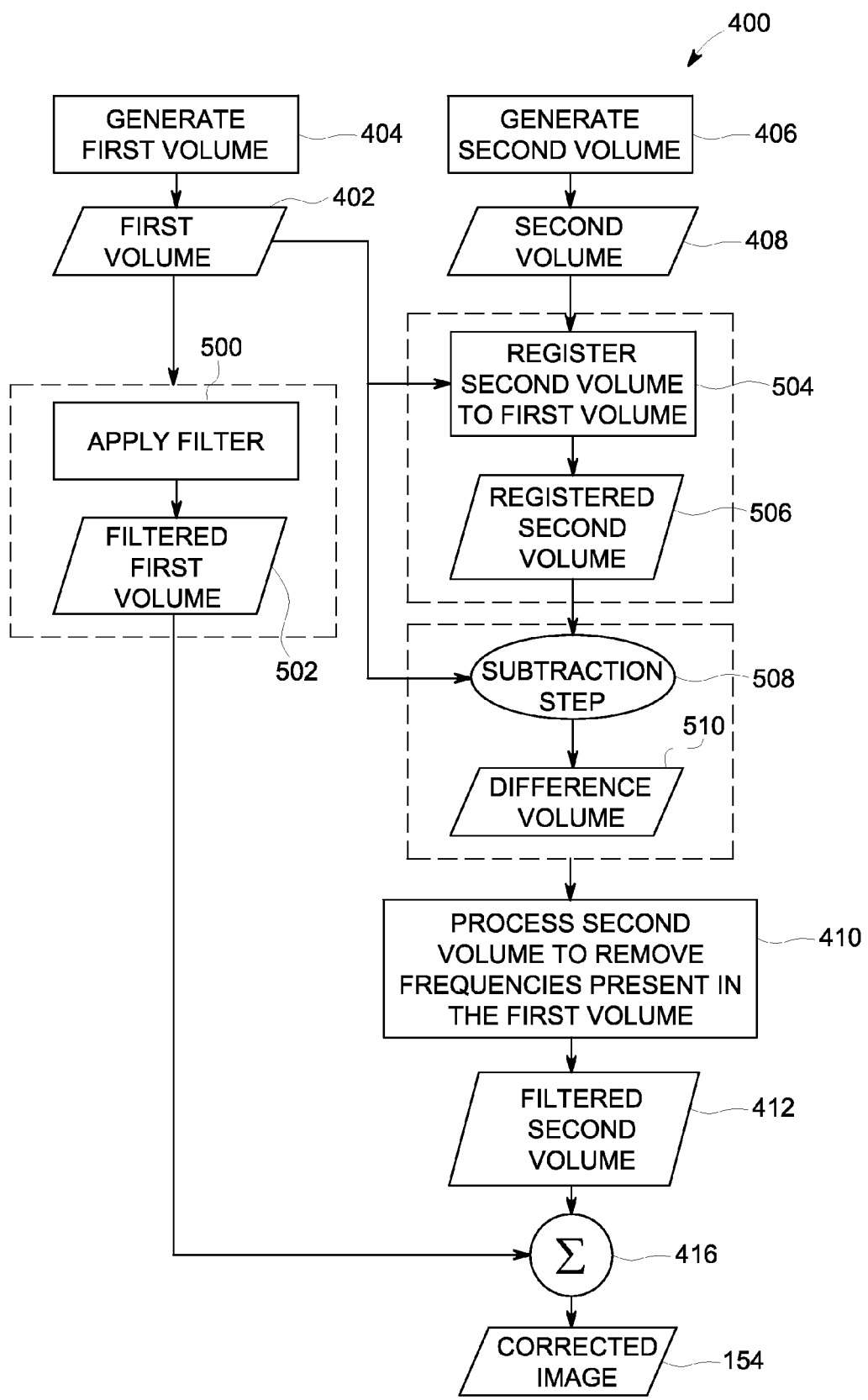
FIG. 19 depicts a flowchart describing a further algorithm for implementing an image reconstruction process, in accordance with aspects of the present disclosure.

One alternative algorithm for addressing the missing frequency issue is depicted in FIG. 19. As depicted in the flowchart 400 of FIG. 19, in accordance with this approach a first image volume 402 is generated (block 404). In one embodiment, the first volume 402 may be generated by an axial scan, such as a gated axial scan. For example, the first volume 402 may be generated by scanning an object and applying an existing reconstruction method, such as a half-scan or a full-scan Feldkamp-type reconstruction.

A second image volume 408 is also generated (block 406) that includes frequency information that is missing or corrupted in the first imaging volume 402. The second volume 408 can be generated in a variety of ways, such as by reconstructing a helical dataset, reconstructing a dataset obtained using a saddle trajectory, reconstructing any other type of dataset that contains at least some frequency components that the first image volume 402 does not contain, and/or by reconstructing a scout scan or using the scout scan directly. By way of example, in one embodiment, the second volume 408 may be generated using a low-dose helical scan. In other implementations, the second volume 408 may be generated by modifying the first volume 402 in a non-linear fashion, as discussed elsewhere herein. In one implementation, the second volume 408 may be registered (block 504) to the first volume 402 to produce a registered second volume 506 using a rigid or non-rigid registration operation.

In one embodiment, the first volume 402 can optionally (as denoted by the dotted lines surrounding these steps) be processed to eliminate frequencies that will be completed by the second image volume 408. This processing may be performed using a filtering operation 500 (such as a shift-variant filter), which is complementary to the filtering operation 410 (i.e., if any single volume is input to both filters, the sum of the two output volumes will be equal to the single input volume), to produce a filtered first volume 502. The registered second volume 506 (or original second volume 408 if registration is not performed) may optionally (as denoted by the surrounding dotted lines) have the first volume 402 subtracted (block 508) to produce a difference volume 510. This difference volume 510 (or registered second volume 506, or original second volume 408, depending on whether or not registration and subtraction is done) is then processed (block 410) to eliminate frequencies that are already present in the first image volume 402. This processing is done using a (possibly shift-variant) filter to produce a second filtered volume 412. This second filtered volume 412 is then added (block 416) to the first filtered volume 502 (or the original first volume 402 if step 500 is omitted) to produce a corrected volume 154. While the preceding discussion relates various optional steps that may be performed, it should be appreciated that typically steps 500 and 508 described above would not both be done due to their mathematical equivalence, i.e., due to the filter operation 410 being complementary to the filter operation 500.

In certain embodiments, these steps may be iterated (with the corrected volume 154 taking the place of the first volume 402 in the process) to add as much missing or corrupted frequency data to the corrected volume 154 as possible or as desired. The corrected image volume 154 contains frequency components present in the first volume 402 as well as frequency components otherwise absent or corrupted in the first volume 402.

Technical effects of the invention include recovering missing frequencies in frequency space to allow for correction of certain types of image artifacts, such as cone-beam artifacts. One technical effect is the construction of a simplified volume from an initial reconstruction using a non-linear function. Frequencies missing in the initial reconstruction may be extracted from the simplified volume and added to the initial reconstruction so that the resulting reconstruction is substantially complete in frequency space. In another embodiment, a technical effect is the reconstruction of an initial volume and the segmentation of high-contrast object from the initial volume, thereby resulting in the high-contrast objects and the remaining image. A frequency mask is applied to the remaining image to remove unwanted frequencies and the high-contrast objects are added to the masked image so that the resulting reconstruction is substantially complete in frequency space.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of tomographic image reconstruction comprising:
reconstructing a first image volume from an incomplete projection dataset that has incomplete frequency data;
reconstructing a second image volume from a projection dataset that includes the frequency data missing from the incomplete projection dataset;
taking the difference of the first image volume and the second image volume to produce a difference volume;
projecting the difference volume over a set of view angles in a parallel three-dimensional geometry to produce a respective set of parallel views;

applying shift-variant filtration to the set of parallel views to remove frequencies that are represented in at least the incomplete projection dataset to produce a set of filtered parallel views;

backprojecting the filtered parallel views to produce a filtered difference volume; and adding the filtered difference volume to the first image volume to produce a final image volume.

2. The method of claim 1, wherein the incomplete projection dataset comprises a gated axial scan and the projection dataset comprises a low dose helical scan dataset.

3. The method of claim 1, wherein applying shift variant filtration comprises:

taking a parallel derivative along the gradient of the respective view angle;

identifying families of lines in projection space that correspond to planes that are tangent to the vertex path of the incomplete projection dataset;

applying a series of one-dimensional Hilbert filters on the identified lines; and weighting and summing the result.

4. The method of claim 1, wherein the difference volume is smoothed and downsampled prior to being projected and is upsampled and interpolated following the backprojection.

5. A method for processing tomographic projection data, comprising:

reconstructing an initial volume from a set of tomographic scan data, wherein the initial volume comprises inaccurate or incomplete frequency data;

applying a non-linear operation to the initial volume to generate a modified volume from the initial volume, wherein the non-linear operation first assigns each voxel of the initial volume to one of a plurality of discrete composition categories based on an observed intensity for each respective voxel and, second, generates the modified volume by changing the intensity value of at least a portion of the voxels based on their respective assigned composition categories, wherein the respective intensity values are changed to values defined for the respective composition categories and wherein the modified volume comprises frequencies missing from the initial volume;

filtering the modified volume to obtain a filtered volume representing a subset of the frequencies from the modified volume that are missing from the initial volume; and combining the filtered volume and the initial volume to generate a corrected image.

6. The method of claim 5, further comprising applying a filter to the initial volume prior to combining the initial volume and the filtered volume, wherein the filter is complementary to the filter applied to the modified volume.

7. The method of claim 5, wherein the non-linear operation introduces into the modified volume estimates of frequency components that are missing or corrupted in the initial volume.

8. The method of claim 5, wherein the missing or corrupted frequency components comprises one or more of missing frequencies, incorrectly weighted frequencies, or inaccurate frequencies.

9. The method of claim 5, wherein filtering the modified volume comprises applying a filter that removes frequencies that are present and uncorrupted in the initial volume and which preserves the frequencies present in the modified volume but absent from or corrupted in the initial volume.

10. The method of claim 5, comprising iterating the acts of generating, filtering, and combining, wherein the corrected image is used to iteratively generate the modified volume during the iterated steps.

11. The method of claim 5, wherein combining the filtered volume and the initial volume comprises adding or subtracting the filtered volume and the initial volume.

12. The method of claim 5, wherein filtering the modified volume comprises applying a shift variant filter.

13. The method of claim 5, wherein filtering the modified volume comprises applying a shift invariant filter.

14. The method of claim 5 wherein filtering the modified volume comprises:

splitting the modified volume into overlapping sub-volumes;

applying a respective shift invariant filter to each sub-volume to generate respective filtered sub-volumes; and blending the filtered sub-volumes to generate the filtered volume.

15. The method of claim 5, wherein filtering the modified volume comprises:

projecting the modified volume at a series of view angles to generate a series of corresponding projected images;

filtering the series of projected images to generate a series of respective filtered projection images; and backprojecting the series of filtered projection images to acquire the filtered volume representing a subset of the frequencies.

16. The method of claim 15, wherein each projection is a parallel projection.

17. The method of claim 15, wherein filtering the projected image comprises:

applying a Hilbert transform along a plurality of families of lines to derivatives based on the projected image;

weighting the respective Hilbert transforms from each family of lines to produce a plurality of weighted Hilbert transform images; and adding the weighted Hilbert transform images to produce the filtered projection image.

18. The method of claim 5, comprising:

applying one or both of smoothing or downsampling to the modified volume prior to filtering; and applying one or both of upsampling or interpolation to the one or more frequencies after filtering.

19. A method for processing tomographic projection data, comprising:

reconstructing an initial volume from a set of tomographic scan data, wherein the initial volume comprises inaccurate or incomplete frequency data;

applying a non-linear operation to the initial volume to generate a modified volume from the initial volume, wherein the non-linear operation first assigns each voxel of the initial volume to one of a plurality of discrete composition categories based on an observed intensity for each respective voxel and, second, generates the modified volume by changing the intensity value of at least a portion of the voxels based on their respective assigned composition categories, wherein the respective intensity values are changed to values defined for the respective composition categories and wherein the modified volume comprises frequencies missing from the initial volume;

subtracting the initial volume from the modified volume to generate a difference volume;

filtering the difference volume to obtain a filtered volume representing a subset of frequencies from the difference volume that are missing from the initial volume; and combining the filtered volume and the initial volume to generate a corrected image.

20. The method of claim 19, wherein the non-linear operation is used to introduce into the modified volume estimates of frequency components that are missing or corrupted in the initial volume.

21. The method of claim 19, wherein filtering the difference volume comprises applying a shift-variant filter.

22. One or more non-transitory computer-readable media, encoding one or more routines which, when executed by a processor, cause the processor to perform acts comprising:
   reconstructing an initial volume from a set of tomographic scan data, wherein the initial volume comprises inaccurate or incomplete frequency data;
   applying a non-linear operation to the initial volume to generate a modified volume from the initial volume, wherein the non-linear operation first assigns each voxel of the initial volume to one of a plurality of discrete composition categories based on an observed intensity for each respective voxel and, second, generates the modified volume by changing the intensity value of at least a portion of the voxels based on their respective assigned composition categories, wherein the respective intensity values are changed to values defined for the respective composition categories and wherein the modified volume comprises frequencies missing from the initial volume;
   filtering the modified volume to obtain a filtered volume representing a subset of the frequencies from the modified volume that are missing from the initial volume; and
   combining the filtered volume and the initial volume to generate a corrected image.

23. An image processing system, comprising:
   a memory storing one or more routines; and
   a processing component configured to execute the one or more routines stored in the memory, wherein the one or more routines, when executed by the processing component:
      reconstruct an initial volume from a set of tomographic scan data, wherein the initial volume comprises inaccurate or incomplete frequency data;
      apply a non-linear operation to the initial volume to generate a modified volume from the initial volume, wherein the non-linear operation first assigns each voxel of the initial volume to one of a plurality of discrete composition categories based on an observed intensity for each respective voxel and, second, generates the modified volume by changing the intensity value of at least a portion of the voxels based on their respective assigned composition categories, wherein the respective intensity values are changed to values defined for the respective composition categories and wherein the modified volume comprises frequencies missing from the initial volume;
      filter the modified volume to obtain a filtered volume representing a subset of the frequencies from the modified volume that are missing from the initial volume; and
      combine the filtered volume and the initial volume to generate a corrected image.

* * * * *